FIG. I

INVENTOR.
JAMES H. KUZARA
BY
Fraser, Wilson & Fraser
ATTORNEYS

INVENTOR
JAMES H. KUZARA
BY
Fraser, Wilson + Fraser
ATTORNEYS

INVENTOR.
JAMES H. KUZARA
BY
Fraser, Wilson & Fraser
ATTORNEYS 3,450,231

GROUP ELEVATOR CONTROL HAVING CAR CALL RESET OF ADVANCE HALL CALL ASSIGNMENT

James H. Kuzara, Sylvania, Ohio, assignor to The Reliance Electric and Engineering Company, Cleveland, Ohio, a corporation of Ohio Filed Jan. 20, 1967, Ser. No. 610,574
Int. Cl. B66b *1/00*
U.S. Cl. 187—29 9 Claims

ABSTRACT OF THE DISCLOSURE

An elevator control which allots each hall call to an individual car and, in response to each car call imposed upon an individual car, releases the hall calls allotted thereto for floors for which no corresponding car calls are registered. Hall calls thus released are then reallotted.

This invention relates to supervisory controls for elevators and more particularly to supervisory controls which assign calls which can be served by any of a plurality of cars to an individual car. The invention is applicable, for example, to systems of the type disclosed in United States patent applications Ser. No. 493,973 by Donivan L. Hall and William C. Susor and Ser. No. 494,194 by Donivan L. Hall, William C. Susor and James H. Kuzara both of which are entitled "Elevator Control" and both of which were filed Oct. 8, 1965.

In systems of the above noted type, calls which can be answered by several cars, usually hall calls, are evaluated with respect to the disposition of the cars both from a spatial and service requirement aspect and are assigned to a car having a favorable relationship to the call. In the system of the first mentioned application the car-to-call relationship must be within a certain threshold relationship as to number of calls imposed on the car and separation of the car from the call to assign the car to the call. In the system of the second application the car-to-call relationship is optimized so that the car best situated to serve the call is assigned to the call. After assignment has been made between a car and hall call both systems retain that assignment until the call is cancelled by the response of the assigned car unless another car stops at the floor of the call as for a car call or the assigned car is rendered incapable of service as by an overload. The service balance between cars frequently changes between the time of assignment of a hall call and the arrival of the assigned car at the floor of the call such that another car becomes more readily available for service to the floor. Each registration of a car call alters the service requirements imposed upon that car and tends to impair that car's ability to serve hall calls assigned to it.

The present invention has as a primary object the improvement of group supervisory controls for elevator systems.

Another object is to serve hall calls with the car best suited to provide the service.

Another object is to assign to a hall call that car which is best situated to serve the call and to alter the assignment of each car when service conditions warrant such alteration.

Another object is to optimize service assignments to each elevator car in response to each significant change in service requirement. In particular, each registration of a car call releases for reassignment all hall calls assigned to a car for floors for which the car has no car calls to which it will respond in a service direction corresponding to the hall calls. Released hall calls are allotted to cars on the basis they were originally allotted, thereby tending to maintain the best service distribution of which the system is capable.

In accordance with the above objects one feature of this invention resides in a control which releases hall calls assigned to a car that they can be reassigned to any of a plurality of cars in response to registration of a car call in that car.

Another feature resides in means for retaining assignment of hall calls to a car in which a car call is registered when that car has a car call for the same floor which it will serve in the service direction of the hall call.

The above and additional objects and features will be more fully appreciated from the following detailed description when read with reference to the accompanying drawings in which.

Figure 1:
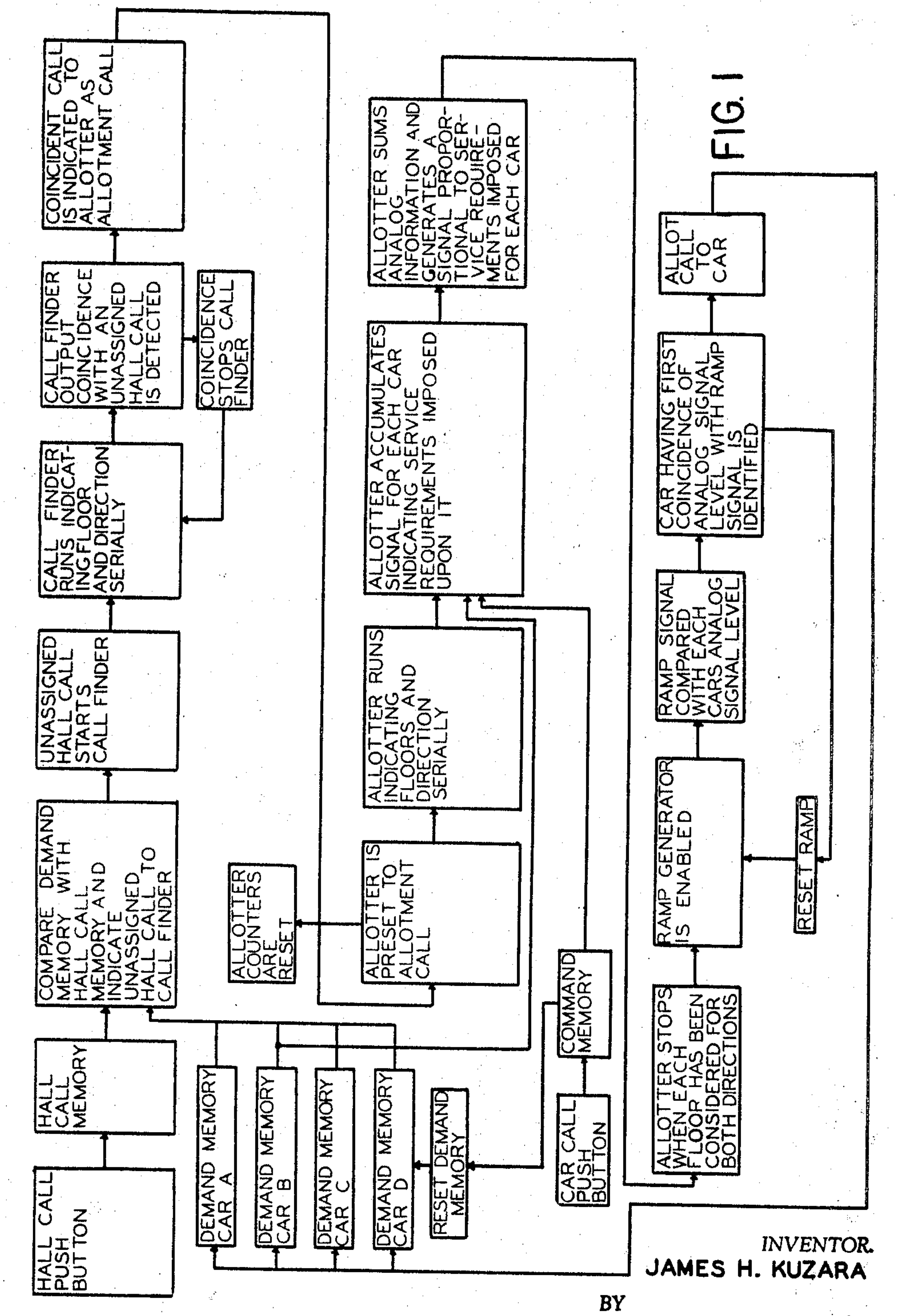
FIG. 1 is a functional block diagram of one group supervisory system for elevators to which the present invention is applied.

As disclosed in the patent application Ser. No. 494,194 noted above each hall call can be assigned to that car of a plurality which is best situated at that time to serve that call. This is illustrated in FIG. 1 which represents the registration of a hall call by an intending passenger at a landing operating a call switch which may be a conventional push button (not shown). Ordinarily each landing above the lowermost is provided with a button to call for down travel therefrom and each below the uppermost has a button to call for up travel therefrom. When a hall call button is operated, it stores a hall call in a memory where it is retained until a car providing service in the call direction stops at the floor of the call.

Figure 3:
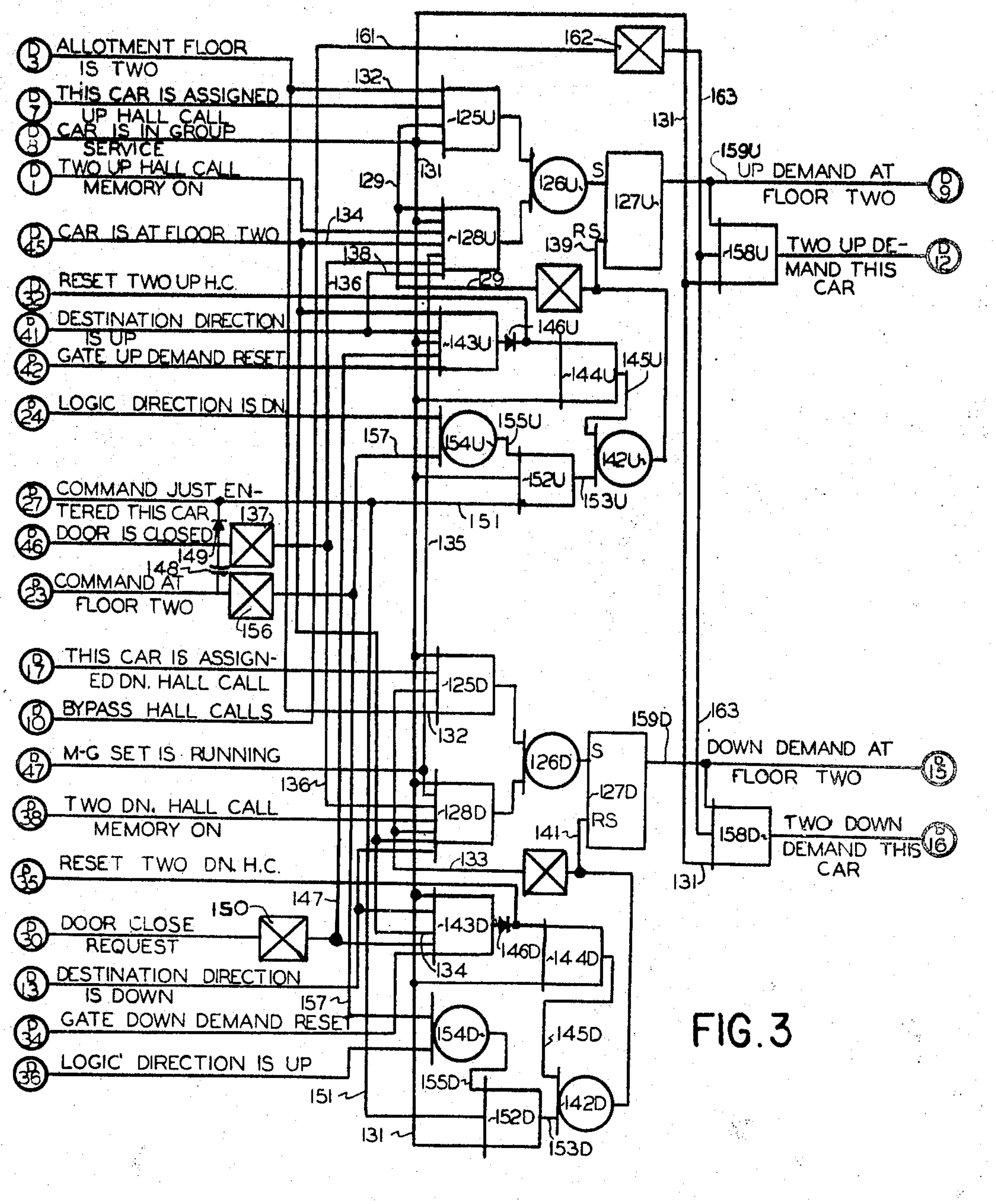
FIG. 3 is a logic diagram of a typical demand memory for one floor and one car to store hall calls assigned to the car for that floor and to release those calls according to this invention.

Stored hall calls when assigned to a car are termed "demands" and are stored in a demand memory of the type shown in FIG. 3. Assignment is accomplished by considering each hall call individually. Hall calls as stored in the hall call memory for a floor are compared with the command memories and demand memories of each car for that floor to ascertain if a call had been assigned either as a car call or a hall call. If a car call had been registered in a car traveling in the service direction of the hall call and for the floor of the hall call, the demand memory for that car, floor and service direction is set. If no coincidence of a car having a set command memory for the floor and direction of the set hall call memory exists, then an unassigned hall call is indicated to a call finder which scans the floors directionally until it is coincident with an unassigned hall call both as to floor and service direction. The found call stops the scanning of the call finder and is indicated to an allotter as a call to be allotted.

The allotter develops an analog signal for each car in group service which is characteristic of the service capability of that car with respect to the allottment call. It does this by counting the number of floors of travel between the call and each car in counters individual to the cars, counting the number of demands and commands imposed upon each car for floors between the allottment call and the car, counting the number of demands and commands imposed upon each car for floors separated from the car by the allottment call, and the degree of loading of each car. In order to ascertain these distances and the relation of the calls the allotter scans the car travel by being preset to the floor and travel-scan direction established by the call finder. During preset its counters are also reset. Thereafter the allotter runs to scan the entire travel, indicating for each car's counters the significant distances as floor counts and the calls when co-incident with scan positions to produce counts in the several counters of each car which can be converted to analog signals.

When the allotter has scanned each floor for all service directions available at that floor it stops. The sum of the analog signals for each car is compared with a signal which increases with time as developed in a ramp generator started at the end of the allotter scan. The first coincidence of a summed car signal with the ramp signal magnitude terminates the ramp generator, resets the ramp generator, and identifies the car having the coincident sum signal. This car is thus the best disposed servicewise to serve the unassigned hall call and the call is therefore allotted to the car by setting the car's demand memory for the floor and service direction of the hall call.

In accordance with this invention it is recognized that each registration of a car call, a command, in a car alters the car's ability to serve assigned hall calls, demands, and may result in some other car being better situated to serve the hall calls from which the demands were developed. This becomes evident when it is recognized that the demands and commands between the car and the floor of the hall call, together with the number of floors between those locations are related to the amount of time the car will require before it reaches the call, the predicted answer time for the call. Further, the demands and commands separated from the car by the floor of the call represent time required by the car to free itself completely to serve the prospective passenger at the floor of the call. The imposition of each new command thus alters these factors and their sum which can be viewed as predicted service time.

The system is dynamic in that commands and demands are being answered by the cars to further alter their service capabilities and predicted service time for each call. Thus the cars will reduce and increase their service requirements after allottment of a demand and before they are cancelled by the stop of the assigned car at the floor of the demand.

Each registration of a car call to impose a command on the car in which the call is registered applies a reset signal to all demand memories for that car in order to permit the reallottment of those hall calls, retained in the hall call memories, to the cars best situated to serve them. The demand memories are arranged to be reset only if the command memory and the setting of car logic direction is not in correspondence with the floor and service direction of the demand. This minimizes the number of stops required of the cars by eliminating from reallottment those hall calls for floors for which car calls are registered and retaining the demand in the car having the command.

Figure 2:
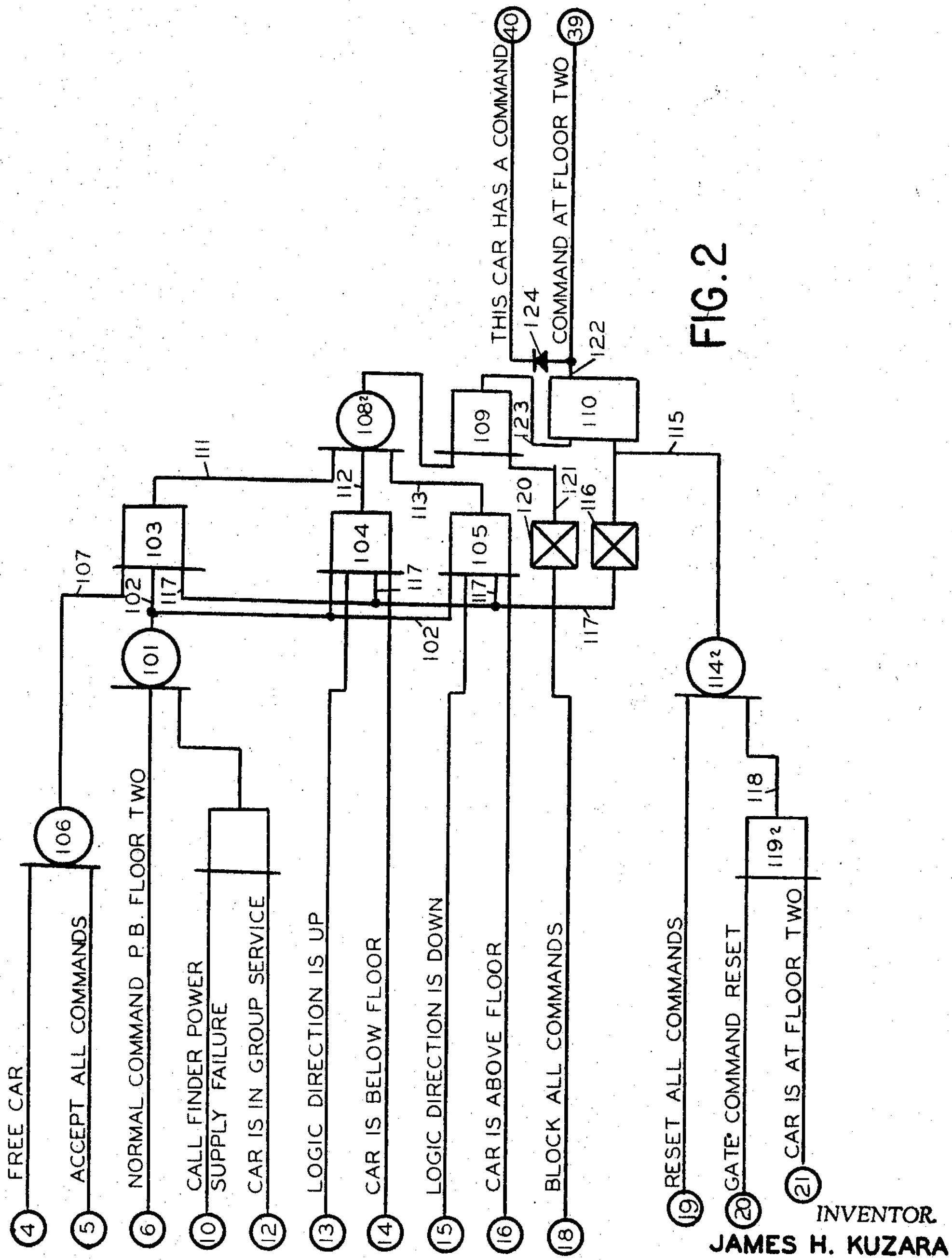
FIG. 2 is a logic diagram of a typical command memory actuated by car calls for one floor and one car to function in this invention.

One command memory for a floor is illustrated in logic diagram form in FIG. 2. In the logic diagrams of FIGS. 2 and 3 conventional logic elements are depicted as typified by OR 101 which issues a positive output signal on lead 102 when a positive signal is applied to any of its inputs, by AND 103 which is a coincidence gate requiring a positive signal on each of its inputs to gate a positive signal to its output 111, by inverter 116 which inverts a positive signal to a negative signal and a negative signal to a positive signal, and by flip flop 110 which is a bistable circuit which issues a positive output 122 when set by a positive impulse on its set input 123 and is restored to a reset condition in which no positive signal is issued by a positive impulse on its reset input 115. Conveniently these logic systems can be constructed on chassis. FIGS. 2 and 3 each represent a chassis. Terminal pins are provided from the chassis and have been numbered along the drawing margins. The information characteristic of the positive signals applied at or issued from the pins is indicated by a short legend adjacent each pin. In order to distinguish demand memory chassis pins from those of the command memory chassis their numbers have been prefixed by a D.

The system is of high operating speeds such that allottment of a call is accomplished in a millisecond. In practice this is accomplished by employing semiconductive elements as the active elements of the logic units and by employing plug-in board type chassis the details of which are well known.

The call memories, call finder, allotter, counters, ramp generator and comparators cooperating with the memories of FIGS. 2 and 3 are disclosed in detail in application Ser. No. 494,194 which is incorporated herein for a disclosure of a complete system utilizing the features of this invention.

A car call as indicated by closing a contact actuated switch on the car control panel produces a positive signal on pin 6 to OR 101 which issues a positive signal on lead 102 to ANDs 103, 104 and 105. The car for the command memory has three possible states. If it has no commands or demands it is a free car and a positive signal is present on pin 4 to gate OR 106 to lead 107 and AND 103. Alternatively OR 106 can be gated by a positive signal at pin 5 indicative of an "accept all commands" condition imposed on the car by special controls as when on independent service or in an emergency bypass operating mode (as for hospital service). The control is arranged to accept car calls as commands in an active car, one having a command or demand, only if the call is for a floor ahead of the car. Thus if the car logic direction is "up," a positive signal appears at pin 13 and is applied to AND 104 and the car is below the floor of the command memory a positive signal is applied to pin 14 and AND 104 to indicate the car will travel to the floor in an ascending direction. A descending car is indicated as being conditioned to travel to the floor of the car call by positive signals at pins 15 and 16 indicating that the logic direction for the car is down and that the car is above the floor, respectively, to partially enable AND 105.

At this point it should be noted that the terms "logic direction" and "destination direction" are distinct. "Logic direction" as applied at pins 15 and D24 represents the direction in which the car is traveling or if stopped the direction in which it will next travel. "Destination direction" is employed in the logic of hall lantern control and hall call reset particularly on a high call reversal or low call reversal operation. It is effective between the initiation of the slowdown of the car and the closing of the car doors after a stop to indicate the direction in which the car will run from the stop. When the highest call assigned an ascending car is a down demand, the up traveling car actuates its "destination direction is down" signal to actuate its down hall lantern at the floor and to generate a down demand memory reset and a down hall call memory reset for the floor. Thus, destination direction need not correspond to travel direction while logic direction will.

An acceptable command gates OR 108 so that when commands are not blocked it gates AND 109 to set the flip flop 110 functioning as the command memory. Each of ANDs 103, 104, 105 are capable of gating OR 108 by a positive signal on lead 111, 112 or 113 respectively. Each of ANDs 103, 104 and 105 can be inhibited if a positive command reset signal is issued by OR 114 on lead 115 to inverter 116 to apply a negative signal on input lead 117. OR 114 is gated by a positive "reset all commands" signal at pin 19 as when the power supply to the control is initially applied or the car is removed from group service. It can also be gated by a positive signal on lead 118 from AND 119 when the car has answered the command in the memory by stopping at the floor. Thus a command reset signal is issued as the car gate opens to apply a positive signal at pin 20 so that AND 119 is gated if the car is at the floor of the command to apply a positive signal at pin 21.

If the car is not conditioned to reset a command at the floor, if the car is conditioned to accept all commands by gating OR 106, or if the floor is ahead of the car, then a car call for the floor represented by a signal at pin 6 gates either AND 103, 104 or 105 to OR 108. The gating of OR 108 indicates an acceptable command which is blocked from the command memory 110 only if AND 109 is inhibited by a "block all commands" signal imposed as a positive signal at pin 18 on inverter 120. Such a signal appears as a negative inhibit on lead 121 to AND 109 and is imposed where it is desired to prevent access to a floor from the car as at night when the floor is locked for security reasons.

Command memory 110 issues a positive signal on lead 122 to pin 39 to indicate a command for the car and the floor of the car call in response to a positive impulse passed over lead 123 from AND 109. The memory is bistable and retains its set condition until a positive reset pulse is applied on lead 115. Lead 122 is coupled through a rectifying diode 124 to pin 40 to provide one input to an OR gate (not shown) which has similar inputs from every other command memory. By applying the signal on pin 40 of each command memory chassis for the car to an OR gate for the car that gate is utilized to signal "this car has a command."

FIG. 3 illustrates the pertinent portions of a demand memory chassis for a typical car and floor illustrating this invention. The demand memory of FIG. 3 is for the same floor and car as the command memory of FIG. 2 and is coupled thereto from pin 39 to pin D23 whereby a command signal is passed to the demand memories for the floor and all other demand memories of the car to reset the demand memories of the car for the opposite logic direction and for floors for which command memories are not set.

As disclosed in detail in application Ser. No. 494,194 a demand memory can be set by the allotter response to a hall call. Demands are directionalized. Accordingly, like elements will be assigned the same numeral reference character and be identified directionally by a suffix U for "up demands" and D for "down demands." Hall call allottment is accomplished by gating AND 125U or 125D to gate OR 126U or 126D and apply a set signal to the demand memory flip flop 127U or 127D in which the demand is stored until cancelled. A demand memory can also be set when a hall call is registered for the floor at which the car is stopped with its doors open by gating AND 128U or 128D to gate OR 126U or 126D.

A normal up hall call allottment is accomplished by the coincidence on the inputs of AND 125U of a positive signal from the call finder (not shown) on pin D3 indicating "this is the allottment floor," a positive signal on lead 129 indicating the absence of an "up demand reset for the floor," a positive signal on lead 131 from pin D8 and the car control (not shown) indicating "car is in group service," and a positive signal from the allotter car assignment gating control (not shown) to pin D7 to signify "this car is assigned up hall call." Down hall calls are allotted when there is a coincidence of positive signals to the inputs of AND 125D from the call finder to lead 132 for "this is the allottment floor," from the car control to lead 131 for "car is in group service," from the down demand memory reset at lead 133 for "no down demand memory reset" and from the allotter car assignment gating control to pin D17 for "this car is assigned down hall call."

At this juncture is should be noted that the hall call assignment by the allotter is independent of the call pickup for slowdown of conventional elevator controls. That is, the assignment of a hall call for a floor can be made any time the car is beyond the location at which slowdown is initiated to bring a car to a stop at the floor and while the call is assigned it is isolated from other cars so that they can run past the floor and otherwise disregard it.

Direct setting of the demand memory for a car present at the floor with its doors open at the time a hall call is registered is accomplished by imposing coincident positive signals on all inputs of AND 128U for an "up car" or AND 128D for a "down car." A "car is in group service" signal is applied on lead 131. The car lead position generator (not shown) applies a positive signal at pin D45 and via lead 134 to ANDs 128U and 128D to signify "the car is at the floor." A "motor-generator set is running" signal is issued from the car control to pin D47 and lead 135. A "door is not closed" signal is applied at lead 136 as a positive signal derived from inverter 137 as actuated by the absence of a "door is closed" signal at pin D46 from the car control. A direct assignment of an up demand through the gating of AND 128U also requires an "absence of an up demand reset" signal on lead 129, a "destination direction is up" signal on lead 138 at pin D41 from the car control, and an "up hall call memory is set" signal at pin D1. Corresponding signals gate AND 128D for a down demand by a "down hall call memory is set" signal at pin D38, a "destination direction is down" signal at pin D13 and an "absence of a down demand reset" signal on lead 133.

A demand memory is reset by applying a positive signal to the reset lead 139 or 141 of the up or down demand memory flip-flop respectively as gated by demand reset OR 142U or 142D. The issuances of a door close request while the car is at a floor set to travel in the demand direction and subject to a demand reset signal will reset the demand by gating AND 143U or 143D to AND 144U or 144D and lead 145U or 145D to OR 142U or 142D. ANDs 144U and 144D can be gated if a car is in group service to apply an enable signal on lead 131 by either a reset signal for the car of that demand or by the reset of another car's demand as applied from all other demand memory chassis for the floor interconnected at pin D32 for "reset the up hall call for the floor" and at pin D35 for "reset the down hall call for the floor" signals. Pins D32 and D35 thus provide outputs to and inputs from all other up and down demand memory chassis for the floor. Diodes 146U or 146D enable the outputs of each car's demand reset ANDs 143U and 143D to be coupled as ORs to the respective car's ANDs 144U and 144D of its several demand memories.

Normal cancellation of a demand memory is by coincidence of positive signals to the inputs of AND 143U or 143D. Common signals to these ANDs are the "car is in group service" signal on lead 131, the "car is at the floor" signal on lead 134 and a "no door close request" signal issued to lead 147 by inverter 150 when no "door close request" signal is applied to pin D30 from the car control. An up demand reset also requires a "destination direction is up" signal on lead 138 and a "gate up demand reset" signal on pin D42 from the car control. Down demands are reset by a "gate down demand reset" signal on pin D34 and a "destination direction is down" signal on pin D13.

Registration of a command from the command memory chassis at pin 39 is applied to pin D23 and the resultant initial impulse signal is passed by capacitance 148 and diode 149 to pin D27 and lead 151 supplying reallot reset ANDs 152U and 152D. All of the car's demand memories are bussed together at their pins 27D so that both the up and down reallot reset ANDs 152U and 152D for all demand memories receive an impulse at input 151 for each command memory set for the car. The ANDs 152U and 152D, if gated, apply a gating signal through leads 153U and 153D to ORs 142U and 142D to reset their demand memory flip flops 127U and 127D. Thus all demand memories which have their ANDs 152U and 152D gated by the setting of a command memory for the car are reset.

In order to gate ANDs 152U and 152D their remaining inputs must be enabled. If the car is set for group service a signal is applied to lead 131 to partially satisfy gating conditions. The conditions are further satisfied if reallot reset OR 154U or 154D is gated to input 155U or 155D. If the car logic direction is set for travel opposite the demand memory direction, the OR 154U or 154D is gated. That is, if a car is set to travel or is traveling in the direction opposite that set in the demand memory, as where it is set to travel upward or is ascending the reset of down demand memories of the car is enabled by gating OR 154D from pin D36 by a "logic direction is up" signal from the car control. Reset of up demand memories is enabled if a "logic direction is down" signal is applied to pin D24 from the car control since it gates OR 154U.

ORs 154U and 154D are also gated if there is no command registered for the floor for that car. Absence of a "command at the floor" signal on any demand memory's pin D23 causes inverter 156 to issue a positive signal "no command at the floor" on lead 157 to gate ORs 154U and 154D. Thus ORs 154U and 154D are gated by either the absence of a command for the floor or the setting of the car logic for the opposite direction. Conversely, OR 154U is not gated and a command actuated up demand memory reset is inhibited if the car has a command for the floor and is set with its logic direction up to thereby inhibit AND 152U. OR 154D is not gated and a command actuated down demand memory reset is inhibited by inhibiting AND 152D if the car has a command for the floor and is set with its logic direction down. Thus, all demands alloted to a car for a direction opposite its current logic direction setting are reset by registration of a car call and the setting of a command memory for that car. Further all demands allotted to a car for the direction of the car's current logic direction setting and which do not coincide with commands ahead of the car will be reset by registration of a car call and the setting of a command memory for that car.

When a demand memory is reset by a command the hall call for the corresponding floor is retained by the hall call memory for that floor and appears to the call finder as an unassigned hall call. Accordingly, the call finder is set in operation, finds the call, sets the allotter for call allottment, resets the allotter counters, and initiates allottment of that call as a newly registered call. In this reallottment the hall call is assigned the car in the best condition at that moment to provide the service called for. This may be the same car to which it was previously allotted or it may be another car which is in better condition to serve.

The reassignment of hall calls to individual cars based upon the change in the service burden imposed upon the car by registration of a car call in the car having the assignment has been illustrated with respect to a particular plural car supervisory control. It is to be understood that other types of systems based upon the concept of assignment of hall calls to individuals cars can utilize these concepts to advantage. Accordingly this disclosure is to be read as exemplary and not in a limiting sense.

Having described the invention, I claim:

1. A supervisory control for an elevator system having a plurality of cars serving a plurality of landings comprising means to register hall calls for service at each of a plurality of said landings by prospective passengers, means to register car calls for service at each of a plurality of said landings by passengers within each car, means to assign registered hall calls to one of a plurality of said cars in advance of the arrival of said car at slowdown position for the landing of the hall call, means responsive to the registration of a car call in a car for cancelling the assignment of a hall call to said car, and means to assign a registered hall call to a car following the cancellation of an assignment of said call by said cancelling means.

2. A combination according to claim 1 wherein said cancelling means is capable of cancelling the assignment of a plurality of hall calls assigned to said car.

3. A combination according to claim 1 including means to sense the logic direction of each car individually, said hall call registering means including up service call means and down service call means, and wherein said cancelling means cancels the assignment of all hall calls assigned to said car which are for the service direction opposite the logic direction of said car.

4. A combination according to claim 1 wherein said cancelling means is capable of cancelling the assignment to said car of all hall calls for floors for which no car call registering means for said car is operated.

5. A combination according to claim 1 wherein said cancelling means generates a cancelling signal for all hall calls assigned to said car, means for each car for setting the logic direction of said car, and means to inhibit said cancellation by said cancelling signal of hall calls assigned to said car which are for service in the logic direction of the car and are for landings for which said car call means of said car is operated.

6. A combination according to claim 1 including means for each hall call for each car for storing hall calls assigned to said car, reset means for said storing means, a coincidence gate for passing a reset signal to said reset means, means to apply an enabling signal to said gate in response to an unoperated car call registering means for said car for said landing of said hall call storage means, and means to apply a gating signal to said gate in response to the registration of a car call.

7. A combination according to claim 6 wherein said gating signal is an impulse applied at the initial registration of said car call.

8. A combination according to claim 1 wherein each hall call registering means is for service in either an up service direction or a down service direction, means for each hall call for each car for storing hall calls assigned to said car, reset means for said storing means, a coincidence gate for passing a reset signal to said reset means, means for each car for setting the logic direction of said car, means to apply an enabling signal to said gate in response to a setting by said logic direction setting means for said car for a direction opposite the service direction of said stored hall call, and means to apply a gating signal to said gate in response to the registration of a car call.

9. A combination according to claim 1 wherein each hall call registering means is for service in either an up service direction or a down service direction, means for each hall call for each car for storing hall calls assigned to said car, reset mans for said storing means, a coincidence gate for passing a reset signal to said reset means, means for each car for setting the logic direction of said car, an OR gate to apply when gated an enabling signal to said coincidence gate, means to apply a gating signal to said OR gate in response to an unoperated car call registering means for said car for said landing of said hall call storage means, means to apply a gating signal to said OR gate in response to a setting by said logic direction setting means for said car for a direction opposite the service direction of the hall call stored in said hall call storing means.

References Cited

UNITED STATES PATENTS

| | | | |
|---|---|---|---|
| 2,941,624 | 6/1960 | Keppler et al. | 187—29 |
| 3,146,858 | 9/1964 | Leroux et al. | 187—29 |
| 3,379,284 | 4/1968 | Yeasting | 187—29 |

ORIS L. RADER, *Primary Examiner.*

W. E. DUNCANSON, Jr., *Assistant Examiner.*